April 1, 1930.  W. M. MOLDEN  1,753,129
DETACHABLE CONNECTION AND CLAMP
Filed April 4, 1928
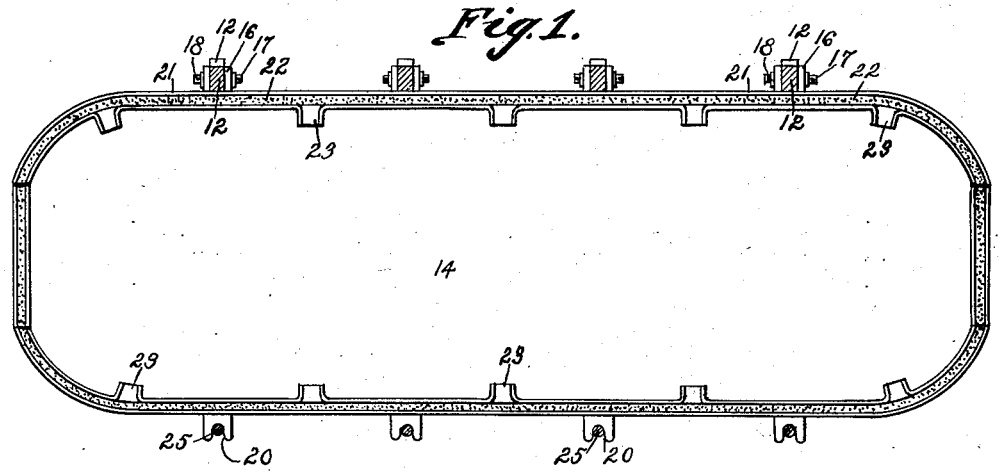
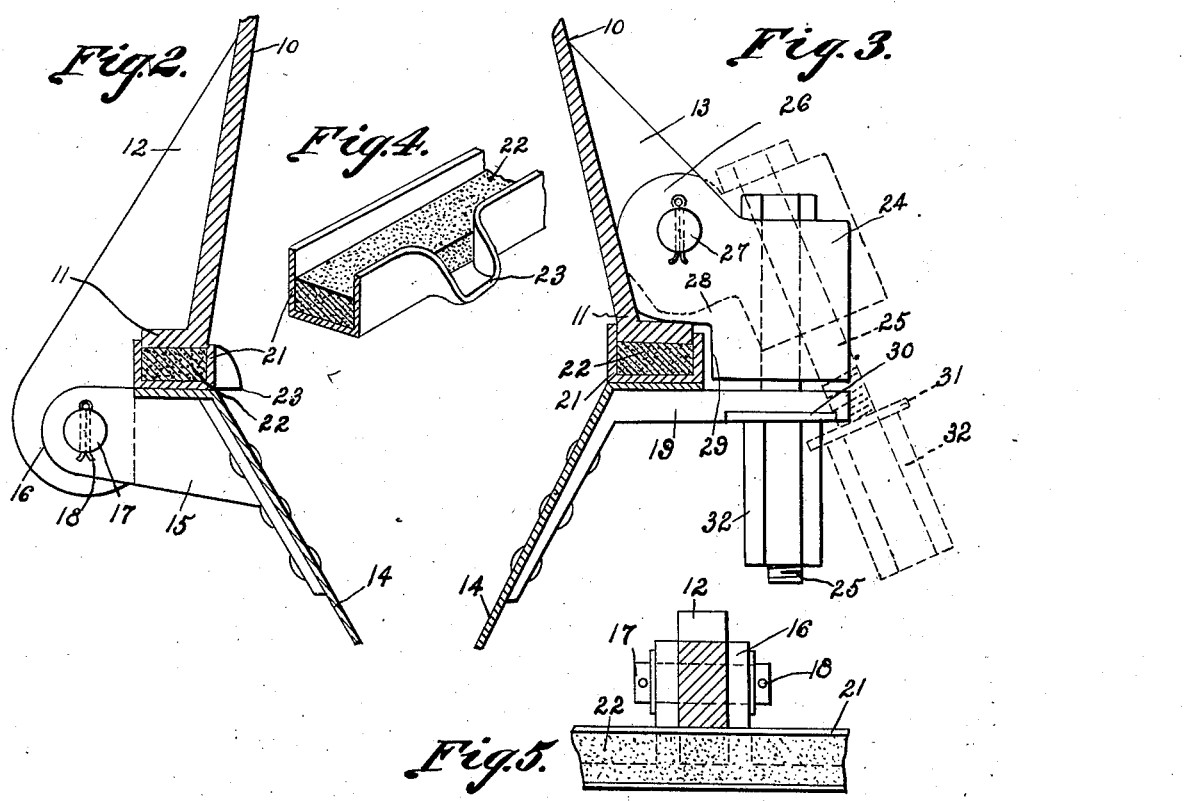
William M. Molden INVENTOR
BY Victor J. Evans ATTORNEY
WITNESS:

Patented Apr. 1, 1930

1,753,129

UNITED STATES PATENT OFFICE

WILLIAM M. MOLDEN, OF LAKE CHARLES, LOUISIANA, ASSIGNOR OF ONE-HALF TO EARL C. REID, OF LAKE CHARLES, LOUISIANA

DETACHABLE CONNECTION AND CLAMP

Application filed April 4, 1928. Serial No. 267,376.

This invention relates to supporting and connecting devices adapted for use upon the oil pans or bases of crank cases for motors and the like.

An object of the invention comprehends a hinge mounting for one side of the pan and from which the latter may swing to occupy open and closed positions.

Another object of the invention contemplates connecting and locking means adapted to sustain the free side of the pan in position for use.

A further object of the invention comprehends channel portions carried by the pan which are filled with suitable packings against which the adjacent portions of the crank case reposes.

An additional feature of the invention embodies drains or spouts inwardly directed from the channels and from which the lubricant splashed within the crank case will drain back within the pan.

More specifically stated, the connecting and locking mechanism is swingably connected with the crank case and which may be swung to occupy an out of the way position when the pan is swung upon the hinge connection.

With the above and other objects in view, the invention further consists of the following novel features and details of construction, to be hereinafter more fully described, illustrated in the accompanying drawing and pointed out in the appended claim.

In the drawing:

Figure 1 is a top plan view of the improved type of pan and connections therewith.

Figures 2 and 3 are fragmentary side elevations of the hinge and locking connections for the pan.

Figure 4 is a fragmentary perspective view of a portion of the channel provided with a spout.

Figure 5 is a horizontal sectional view taken through the crank case and channel portion in Figure 2 of the drawing.

Referring to the drawing in detail, wherein like characters of reference denote corresponding parts, the reference character 10 indicates the portion of a crank case provided with outstanding flange portions 11 upon the lower periphery thereof. The crank case is further provided with flanges or strengthening ribs 12 and 13 upon the opposite sides thereof, the purpose of which will be presently apparent.

The pan, such as indicated at 14, is provided with lugs or extensions 15 upon one side adjacent the flanges or ribs 12 and which are bifurcated upon the outermost ends thereof to provide spaced parallel ears 16 adapted to receive the lowermost portions of the fins or ribs 12. Pins 17 are extended through the ears and ribs and held in position against displacement by cotter pins or other fastening elements, such as indicated at 18.

Plate members 19, carried by and extended outwardly from the opposite side of the pan or base 14 in spaced parallel relation with respect to the adjacent outstanding flange portion 11 of the crank case 10, are notched or recessed, as indicated at 20, upon the outermost ends thereof.

Channel members 21, are carried or interposed between and secured by any suitable method to the upper edges of the pan 14 and filled with suitable packings 22 to provide seats for the outstanding flange portions 11 of the crank case 10.

Spouts or drain ports 23 are provided upon the innermost side walls of the channels 21 to permit lubricant, splashed upwardly against the innersides of the crank case and draining therefrom toward the packing, to find its way back within the pan located immediately therebeneath.

The locking devices, as mentioned in the foregoing, take the form of blocks or casings 24, bored to receive bolt members 25. Ears 26, carried by the blocks 24 are pivotally mounted upon pins 27, extended through the ribs or fins 13 upon the crank case 10, to dispose shoulder portions 28 upon the lowermost edges of the ears 26 upon the upper sides of the adjacent outstanding flange portions of the crank case. The portions, such as indicated at 29, depending from the shoulder portions 28, are adapted to be disposed in juxtaposition to the outer side walls of the adjacent channel member when swung to occupy the full line position, as best illustrated in Figure 3 of the drawing. The bolt members 25, when disposed in the full line positions are adapted for reception with the recessed or notched portions 20 in the outstanding plates 19. The undersides of the outstanding plates 19, immediately beneath the recessed or notched portions 20 therein, are adapted to receive lock washers 31 retained by nuts 32 carried upon the lowermost tapped ends of the bolts 25. The invention, as apparent from the foregoing description and accompanying drawing, offers an exceedingly useful means adapted to permit easy access to the crank case of an engine.

It is to be noted that it is no longer necessary to remove fastening elements nor shellac gaskets to the crank case and flange portions of oil pans, which are generally constructed of either lead or cork and when once used will leak if replaced for the second time.

From the illustration in Figure 1 of the drawing, it is to be noted that I have employed only four hinge mountings and four locking points whereby it would be only necessary to loosen the four locking points to permit the pan to swing to occupy an out of the way position. The ease in accessibility to the crank case is such that the same could be lowered and wiped clean of crank case dilution each time the oil was changed whereby the life of the working mechanism would be materially prolonged.

Motors equipped with the improved type of pan would prevent loss of lubricant and render the crank case, as a whole, impervious to moisture.

Obviously I may employ the clamping or locking mechanism upon both sides of the pan, if desired. This would permit the pan to be entirely removed from the engine crank case to facilitate access to the interior of the engine.

The invention is susceptible of various changes in its form, proportions and minor details of construction, and the right is herein reserved to make such changes as properly fall within the scope of the appended claim.

Having described the invention, I claim:—

A seal for the oil pans of engine crank cases comprising a channel member seated upon its closed side on the upper edge of the pan to accommodate the depending flange of the crank case within its open side, a packing carried within the open side of the channel engaging said flange, and spouts formed upon the inner side walls of the channel to drain the lubricant from the flange and packing within the pan.

In testimony whereof I affix my signature.

WILLIAM M. MOLDEN.